United States Patent Office 3,449,170
Patented June 10, 1969

3,449,170
MULTICELL STORAGE BATTERY
Rolf Filip Gunnar Thornblad and Per Enar Lennart Frode, Oskarshamn, Sweden, assignors to Svenska Ackumulator Aktiebolaget Jungner, Oskarshamn, Sweden, a corporation of Sweden
Filed Nov. 21, 1966, Ser. No. 595,880
Claims priority, application Sweden, Dec. 21, 1965, 16,588/65
Int. Cl. H01m 35/32, 5/00
U.S. Cl. 136—134     1 Claim

ABSTRACT OF THE DISCLOSURE

A multicell storage battery having a partitioned container dividing the container into a plurality of cell compartments, a single cover for the container having grooved ribs to fit the top of the partitions, and intercell connectors which straddle the partitions, each connector having a hold in its central portion straddling the partition for receiving an adhesive to effect a liquid-tight seal between the compartments, the connectors, and the cover.

---

In storage batteries comprising a plurality of cells in a common container with partitions and a single cover for the whole battery it is desirable to shorten the intercell connectors in order to reduce the weight and the internal resistance of the storage battery. To this purpose it has been proposed to have the intercell connectors extending directly through the partitions of the container. This is, however, not possible since the connectors are so near the electrolyte surface that the electrolyte, when splashing, seeps into the joint between each connector and the associate partition. This results in a bridging between cells, which leads to excessive self-discharge of the battery as well as corrosion of the electrodes.

The object of the present invention is to overcome this difficulty and in a storage battery with a single cover for the whole battery and with grooves arranged in the cover for the outer walls and the partitions of the container, the invention consists in that the intercell connectors are extending over the partition walls which at the upper edge, at least confronting the associate connector, are provided with a notch fitting said connector, the groove in the cover being provided with widenings fitting the outline of each connector, and each connector being provided with a passage hole in its upper part.

Figure 1:
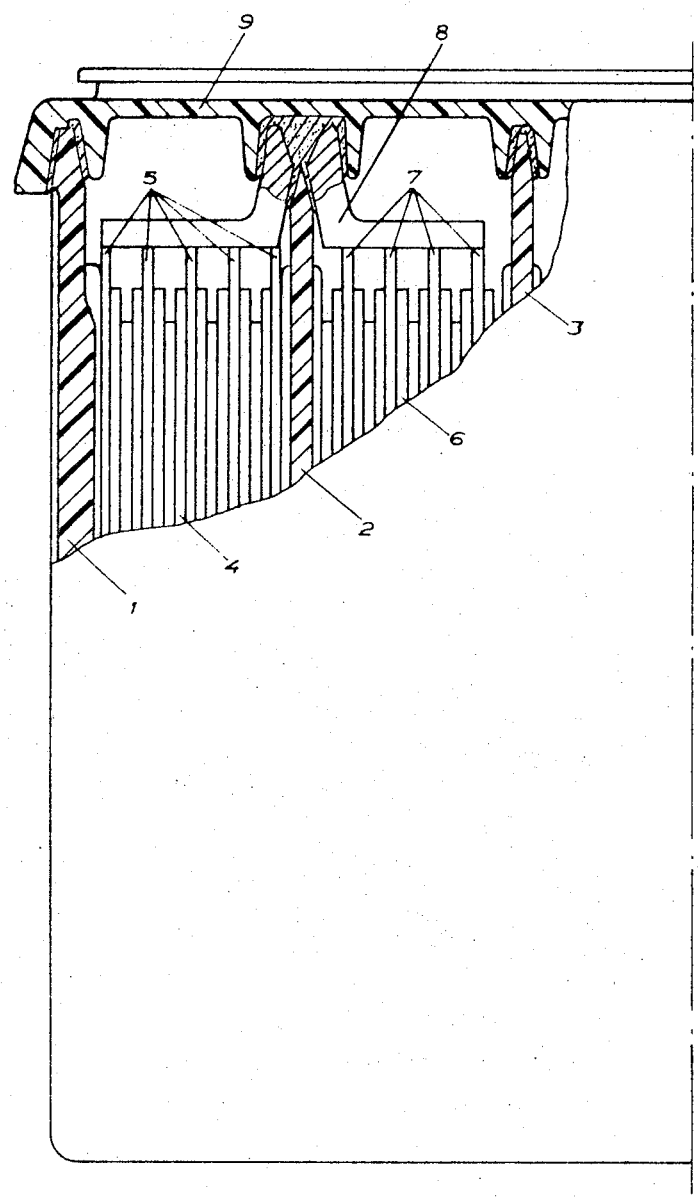
Figure 2:
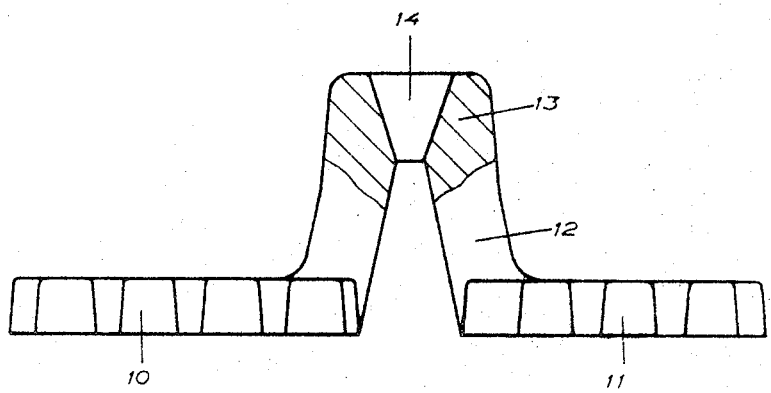
Figure 3:
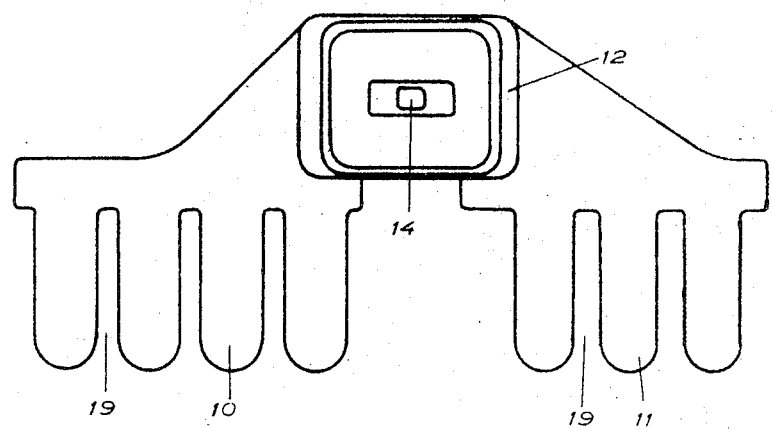
Figure 4:
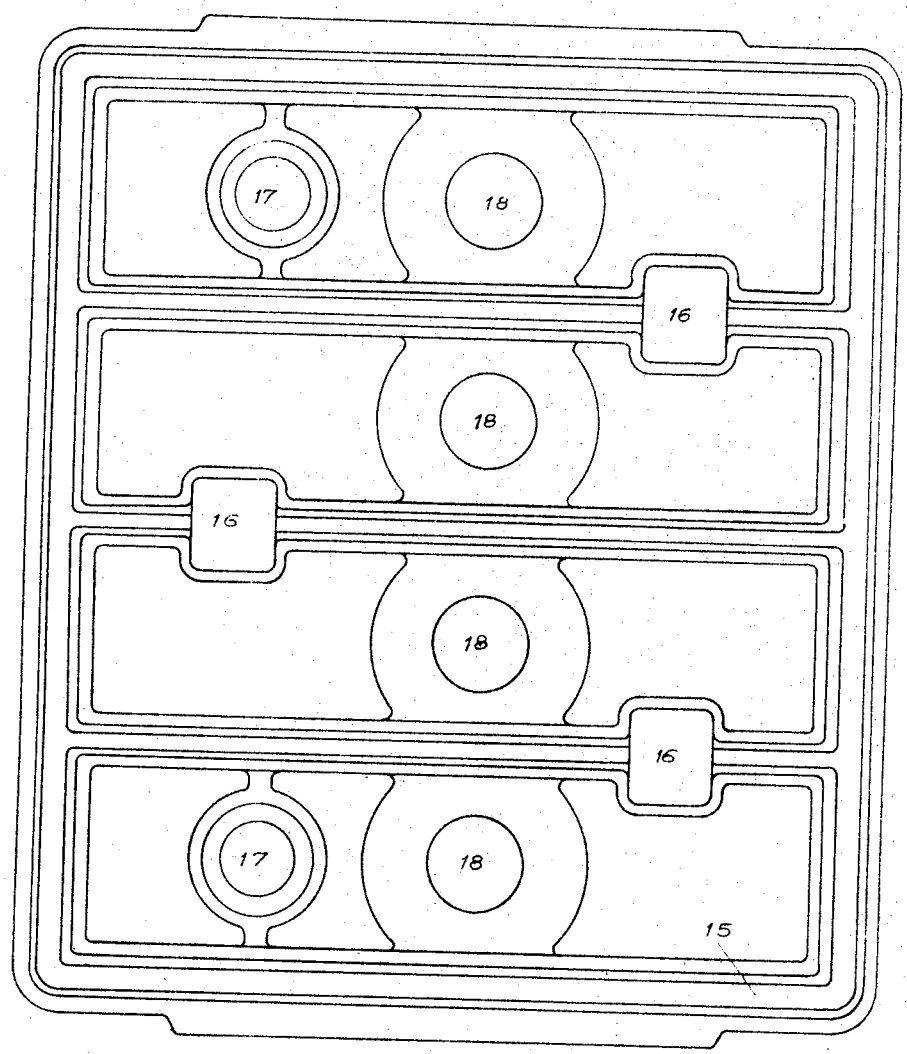

The invention will be more particularly described hereinafter with reference to the accompanying drawings in which:

FIGURE 1 illustrates a part sectional side view of a storage battery incorporating the invention, FIGURE 2 is a side elevation partly in section of an intercell connector for the battery shown in FIGURE 1, FIGURE 3 is a top plan view of the intercell connector shown in FIGURE 2, and FIGURE 4 shows a bottom view of a cover for the battery shown in FIGURE 1.

Referring to FIGURE 1 the outer wall of a storage battery container is designated by 1 and the partition by 2 and 3. An element of positive and negative plates with separators therebetween is designated by 4. The negative plates are provided with contacting lugs 5 at one of their ends, while the lugs of the positive plates of said cell are at the opposite end and therefore not visible on the figure. A similar element of plates and separators arranged in an adjacent cell is designated by 6. In the latter cell the lugs 7 of the positive plates are on the same side as the lugs 5 of the negative plates in the first cell. Said positive and negative plates are interconnected by means of a connecting member 8 in the shape of a yoke. Said yoke is placed astride over the partition 2 which, at the location for the yoke, is provided with a notch. The rest of the partition has the same height as the outer wall 1 and the partition 3 in the figure. The battery is closed by a cover 9 provided with a continuous groove for the outer walls and the partitions, all the parts of said groove being located in the same plane. The groove being located in the same plane. The groove is provided with widenings at its parts which will be located confronting the intercell connectors when the cover is placed on the container.

The shape of the intercell connector 8 is shown more in detail in FIGURES 2 and 3. It comprises two fork-shaped members 10–11 provided with grooves 19 fitting the lugs of the negative plates in one cell and the lugs of the positive plates in the adjacent cell. These members are connected by a yoke-shiped member 12, the upper part 13 of which has the shape of a rectangular truncated pyramid with rounded edges and a passage hole 14 which also has the shape of a rectangular truncated pyramid with its larger base turned upwards.

FIGURE 4 is a bottom view of the cover 9. Said cover is provided with a groove 15 which extends partly along the periphery of the cover and partly across the parts of the cover which will be confronting the partitions of the container. The groove is provided with widenings 16 at the parts which will lie straight above the top member 13 of the connectors 8. The cover is further provided with holes 17 for the terminal posts of the battery and a hole 18 for each cell, which hole is also intended for the filling of electrolyte or water and the checking of the electrolyte level.

The construction in accordance with the invention operates as follows. After that all the elements are mounted in their respective compartments in the container and connected by means of the connectors 8, a suitable adhesive such as an epoxy adhesive is poured into the groove 15, whereby the widenings 16 will also be filled. The battery container with its elements is thereafter turned upside down and pressed against the cover. The outer walls 1 and the partitions 2, 3 etc. will thereby penetrate in the corresponding parts of the groove 15 while the top 13 of the intercell connector 8 will nearly entirely fill out the widenings 16 in the groove. As the container is pressed against the cover the adhesive is forced to flow through the hole 14 and thereby fills out completely all the interstices between the connectors 8 and the partitions of the container. Upon hardening of the adhesive, the storage battery is ready for filling the electrolyte and, if so required, charging or formation. If a thixotrope adhesive is used or if the adhesive is allowed to set partially before the cover is applied, it is not necessary to turn the battery upside down as instead the cover is turned upside down before it is to be put upon the battery.

The intercell connectors must not necessarily be in the shape of a yoke but can also have the shape of a straight bar with an upwardly projecting part provided with a passage hole. The invention as described above has been applied to lead battery but can also be applied to other battery types such as alkaline storage batteries.

What we claim is:
1. A multicell storage battery comprising
   (a) a container with at least one internal partition dividing the container into a plurality of cell compartments;
   (b) a single cover positioned on the container having downward projecting grooved ribs filled with an adhesive and shaped to fit over the upper edge of each partition and over the side walls of the container;

(c) at least one inter-cell connector which straddles the partition and fits in a recess formed in the top of the partition and in the projecting rib of the cover, said rib being provided with an enlargement to closely accommodate the top part of the connector, said connector further having in its central portion a vertical passage hole which has the shape of rectangular truncated pyramid, such that upon placing the cover on the container, a pumping effect is obtained which causes the adhesive in the groove and its enlargement to flow through the hole filling the interstices between the connector and the partition thus forming a liquid-tight seal.

References Cited

UNITED STATES PATENTS

| | | | |
|---|---|---|---|
| 1,692,316 | 11/1928 | Smith | 136—134 XR |
| 1,919,902 | 7/1933 | Nyce | 136—134 |
| 3,259,525 | 7/1966 | Wilson | 136—176 |
| 3,350,237 | 10/1967 | Sealey | 136—176 |

ALLEN B. CURTIS, *Primary Examiner.*

D. L. WALTON, *Assistant Examiner.*

U.S. Cl. X.R.

136—176